(12) United States Patent
Wang et al.

(10) Patent No.: US 12,241,732 B2
(45) Date of Patent: Mar. 4, 2025

(54) DEVICE AND METHOD FOR AUTOMATICALLY DETECTING THROUGH-HOLE RATE OF HONEYCOMB SANDWICH COMPOSITE-BASED ACOUSTIC LINER

(71) Applicant: NANJING UNIVERSITY OF AERONAUTICS AND ASTRONAUTICS, Nanjing (CN)

(72) Inventors: Jun Wang, Nanjing (CN); Zhongde Shan, Nanjing (CN); Hao Tang, Nanjing (CN); Yuanpeng Liu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 284 days.

(21) Appl. No.: 17/701,763

(22) Filed: Mar. 23, 2022

(65) Prior Publication Data
US 2022/0214159 A1 Jul. 7, 2022

(51) Int. Cl.
G01B 11/22 (2006.01)
B25J 9/16 (2006.01)
(Continued)

(52) U.S. Cl.
CPC ............ G01B 11/22 (2013.01); B25J 9/1661 (2013.01); B25J 9/1664 (2013.01); B25J 13/087 (2013.01); B25J 13/088 (2013.01); G01B 11/08 (2013.01)

(58) Field of Classification Search
None
See application file for complete search history.

(56) References Cited

U.S. PATENT DOCUMENTS

2007/0039390 A1* 2/2007 Duncan ................ G01N 29/265
73/606
2010/0309483 A1* 12/2010 Crowther ........... G01B 11/2755
703/7

(Continued)

FOREIGN PATENT DOCUMENTS

| CN | 104914027 A | 9/2015 |
|---|---|---|
| CN | 111811425 A | 10/2020 |
| CN | 110657752 B | 8/2021 |

Primary Examiner — Uzma Alam
Assistant Examiner — Chad Andrew Reverman

(57) ABSTRACT

A device for automatically detecting a through-hole rate of a honeycomb sandwich composite-based acoustic liner, including a customized tooling, a data acquisition system, a motion mechanism and a data processing system. The data acquisition system is configured to acquire a surface three-dimensional (3D) point cloud data of an acoustic liner using a two-dimensional (2D) laser profile sensor in a manner of parallel movement shooting, and connected with a graphics workstation. The motion mechanism includes an industrial robot, and the 2D laser profile sensor is fixed at an end of the industrial robot. The motion mechanism is configured to support the data acquisition system to perform translational scanning. The data processing system includes the graphics workstation, and plays a role of path planning and data storage. A method for automatically detecting a through-hole rate of a honeycomb sandwich composite-based acoustic liner is also provided.

5 Claims, 5 Drawing Sheets

(51) Int. Cl.
*B25J 13/08* (2006.01)
*G01B 11/08* (2006.01)

(56) References Cited

U.S. PATENT DOCUMENTS

| | | | | |
|---|---|---|---|---|
| 2014/0192187 | A1* | 7/2014 | Atwell | G01B 11/25 |
| | | | | 348/136 |
| 2015/0185000 | A1* | 7/2015 | Wilson | G06N 3/084 |
| | | | | 356/601 |
| 2015/0189201 | A1* | 7/2015 | Bridges | G01B 11/25 |
| | | | | 348/46 |
| 2015/0267593 | A1* | 9/2015 | Lauder | G10K 11/172 |
| | | | | 409/143 |
| 2020/0393690 | A1* | 12/2020 | Lee | H04N 23/56 |
| 2024/0077586 | A1* | 3/2024 | Lee | G01S 7/4873 |

* cited by examiner

DEVICE AND METHOD FOR AUTOMATICALLY DETECTING THROUGH-HOLE RATE OF HONEYCOMB SANDWICH COMPOSITE-BASED ACOUSTIC LINER

CROSS-REFERENCE TO RELATED APPLICATIONS

This application claims the benefit of priority from Chinese Patent Application No. 202111142792.2, filed on Sep. 28, 2021. The content of the aforementioned application, including any intervening amendments thereto, is incorporated herein by reference in its entirety.

TECHNICAL FIELD

This application relates to detection of acoustic liners, and more particularly to a device and method for automatically detecting a through-hole rate of a honeycomb sandwich composite-based acoustic liner, which is suitable for point cloud data processing in the field of computer vision.

BACKGROUND

Traditionally, the surface porosity of a composite acoustic liner is often performed manually using a contact measurement method. However, the manual detection struggles with low precision, poor efficiency and high labor intensity, and the contact measurement may also degrade the quality of an acoustic liner surface and an internal sound-absorbing structure.

The non-contact measurement technology has advantages of fast acquisition, large single acquisition volume and no damage to the surface quality of a measured object, and a large number of dense point sets on the entire surface of the sample can be acquired quickly. The three-dimensional (3D) point cloud data acquisition technology has been increasingly perfected, and a measurement accuracy of the linear laser scanner ranges from 0.02 mm to 1 mm, which can meet the general measurement requirements.

The size of holes on the surface of the composite acoustic liner is in the millimeter level, which is much smaller than the general assembly holes, so it is difficult to conduct data acquisition and quality detection using the existing non-contact measurement technology.

SUMMARY

An object of the present disclosure is to provide a device and method for automatically detecting a through-hole rate of a honeycomb sandwich composite-based acoustic liner, which can automatically and quickly identify and detect fine holes on a composite acoustic liner. Through indirectly acquiring a three-dimensional (3D) point cloud data of a surface of the composite acoustic liner, the size and position information of holes can be obtained through algorithm processing.

The technical solutions of the present disclosure are described as follows.

In a first aspect, this application provides a device for automatically detecting a through-hole rate of a honeycomb sandwich composite-based acoustic liner, comprising:
a customized tooling;
a data acquisition system;
a motion mechanism; and
a data processing system;

wherein the data acquisition system is configured to acquire a three-dimensional (3D) point cloud data of a surface of an acoustic liner; the data acquisition system comprises a two-dimensional (2D) laser profile sensor and a controller; the 2D laser profile sensor is configured to collect the 3D point cloud data of the surface of the acoustic liner by parallel movement shooting; and the controller is configured to be connected with a graphics workstation to input an acquired 3D point cloud data for subsequent processing;

the motion mechanism is configured to support the data acquisition system to perform translational scanning; the motion mechanism comprises an industrial robot with six degrees of freedom; an end of the industrial robot is capable of moving according to a path designed by an offline programming software; and the 2D laser profile sensor is fixed at the end of the industrial robot;

the data processing system comprises the graphics workstation; the data processing system is configured to play a role of path planning and data storage in a data acquisition process, and output a detection result through an improved algorithm; and the customized tooling is designed according to a mounting hole of the 2D laser profile sensor and a mounting hole of the end of the industrial robot to enable a position and angle of the 2D laser profile sensor relative to the end of the industrial robot to be fixed.

An angle between an incident light direction of the 2D laser profile sensor and a normal of a local plane to be measured is controlled to be 10° to reduce data noise and overcome surface light absorption of a composite material, thereby improving quality of the acquired 3D point cloud data; and a 2D laser profile data is subjected to registration according to a real-time pose of the end of the industrial robot.

In a second aspect, this application also provides a method for automatically detecting a through-hole rate of a honeycomb sandwich composite-based acoustic liner using the device, comprising:

(S1) acquiring, by the device, a 3D point cloud data of an acoustic liner;

(S2) detecting a spatial distribution of the 3D point cloud data, and preprocessing the 3D point cloud data to partially filter noise point clouds, and remove a hole bottom data;

(S3) detecting a main plane where a circular hole is located; identifying a boundary point cloud of a micro-hole based on a neighborhood calculation method by analyzing a pattern of the micro-hole, and extracting a relevant point; and (S4) subjecting the boundary point cloud to clustering segmentation; calculating a diameter of an actual hole and a hole center coordinate of the actual hole through a circle fitting algorithm based on geometric fitting, and searching the hole bottom data in an original data along a direction of the main plane to get an accurate quality detection result.

In an embodiment, the step (S1) is performed through steps of:

(S101) uniformly acquiring a 2D profile data of a surface of the acoustic liner for multiple times according to a planned trajectory; and (S102) calculating a positional relationship between trajectories according to a preset data acquisition frequency; and subjecting the 2D profile data to registration to obtain the 3D point cloud data according to the positional relationship.

In an embodiment, the step (S2) is performed through steps of:
(S201) calculating two normal vectors in two different scale neighborhoods for each of points in the 3D point cloud data, wherein a scale is determined by a size of the actual hole; and
(S202) subtracting the two normal vectors of each of the points in the 3D point cloud data to obtain a difference vector, and calculating a norm Δn of the difference vector; comparing the norm Δn of each of the points with a preset threshold, wherein points with a norm Δn greater than the preset threshold are regarded as noise; and removing the noise and hole bottom points from original data.

In an embodiment, the step (S3) is performed through steps of:
(S301) processing an input data using a random sample consensus algorithm to extract a plane as the main plane;
(S302) projecting the input data to the main plane;
(S303) calculating a circle formed by each point and other two points in a K neighborhood thereof, and calculating the number $n_p$ of other neighborhood points existing in the circle;
(S304) calculating a boundary parameter $n_b=1-n_p/K$, wherein K is the number of points in a set search neighborhood; and
(S305) comparing the boundary parameter $n_b$ with a preset threshold, wherein in the 3D point cloud data, points with a boundary parameter $n_b$ greater than the preset threshold are taken as boundary points to detect the boundary point cloud.

In an embodiment, the step (S4) is performed through steps of:
(S401) inputting a boundary point cloud data of a hole as $P_0$;
(S402) fitting the input boundary point cloud data into a circle through a Hyperfit algorithm; and obtaining a coordinate of a center of the circle and a radius data $R_i$ of the circle;
(S403) calculating a distance D from each of input boundary points to the circle through an expression of $D=|d-R_i|$, wherein a point with the distance D smaller than a bandwidth B is taken as a point cloud data $P_{i+1}$ input next time;
(S404) comparing the radius $R_i$ with a radius $R^{i-1}$ obtained by a previous fitting to calculate a difference through an expression of $\Delta R_i = R_i - r^{i-1}$;
if the difference $\Delta R_i$ is greater than a preset threshold, continuing running the Hyperfit algorithm;
otherwise, stopping running the Hyperfit algorithm and outputting a final fitting parameter;
(S405) inputting the point cloud data $P_{i+1}$ and repeating steps (S402)-(S404);
(S406) in the original data, making a normal section of a cylinder on the main plane by using the coordinate of the hole center detected in step (S4) as a circle center and a value slightly smaller than a theoretical hole diameter as a diameter; and making a cylindrical bounding box by taking a normal of the main plane as an axis;
(S407) storing a point cloud data in the cylindrical bounding box as the hole bottom data;
(S408) calculating a distance from the hole bottom data to the main plane as a hole detection depth; and
(S409) comparing the hole detection depth with a blockage standard, wherein a hole with a detection depth smaller than the blockage standard is denoted as a blocked hole, and marked in red in the point cloud data; and
counting the number of detected holes and the number of blocked holes, and calculating a through-hole rate $n_t$ through an expression of:

$$n_t = \frac{n_d}{n} * 100\%;$$

wherein $n_d$ is the number of blocked holes and n is the number of detected holes.

Compared to the prior art, the present disclosure has the following beneficial effects.

Compared with the direct hand-held scanning, the data acquisition method of the present disclosure combines a linear laser scanner with an industrial robot, so that it can be applied to parts with different shapes. Moreover, the data acquisition method of the present disclosure reduces the labor intensity and improves the detection efficiency, facilitating the intelligent manufacturing.

The disclosure designs a hardware device suitable for the detection of a through-hole rate of a composite acoustic liner, which includes an industrial robot, a customized tooling and a 2D laser profile sensor configured for rapid acquisition of high-quality data of the surface holes of the acoustic liner. A boundary point extraction algorithm is designed to extract a real data point from the hole edge, so as to provide a theoretical basis for the subsequent fitting algorithm. For the edge point data, a circle fitting algorithm is designed based on robust regression, which facilitates acquiring a more real data and reducing the interference of irrelevant data on the fitting results. A through hole detection algorithm is designed to detect the hole bottom data through fitting a center of the hole, so as to analyze an internal permeability of the hole.

The present disclosure can be used for automatic and rapid quality detection of large workpieces with digital models, especially for the rapid detection of surface holes of an aircraft engine acoustic liner.

DETAILED DESCRIPTION OF EMBODIMENTS

The technical solutions of the present disclosure will be described completely and clearly below with reference to the accompanying drawings and embodiments. Obviously, provided below are merely some embodiments of the disclosure, which are not intended to limit the disclosure. It should be understood that other embodiments obtained by those skilled in the art based on the content disclosed herein without paying any creative effort shall fall within the scope of the present disclosure.

Figure 1:
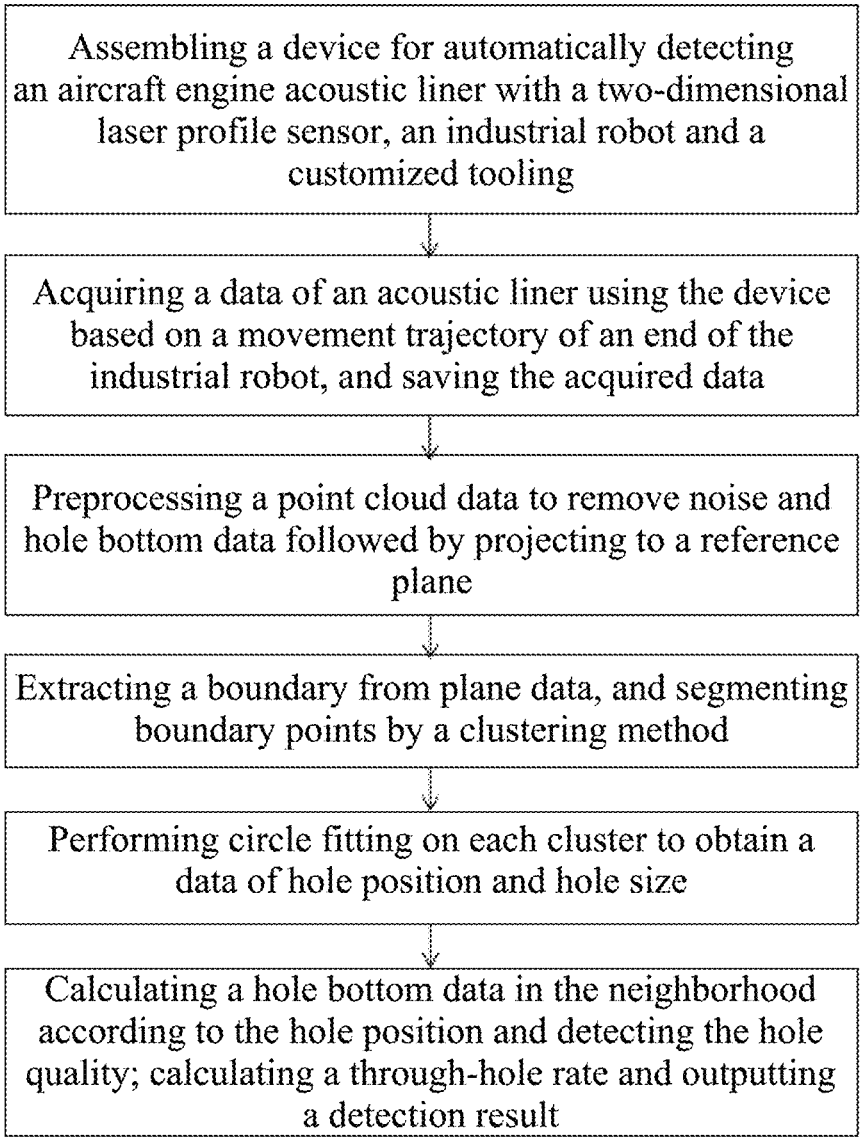
FIG. 1 is a flow chart of a method for automatically detecting a through-hole rate of a honeycomb sandwich composite-based acoustic liner according to an embodiment of the present disclosure.

As shown in FIG. 1, provided herein is a method for automatically rapid positioning and size measurement of surface holes of a blade, which is performed as follows.

Figure 2A:
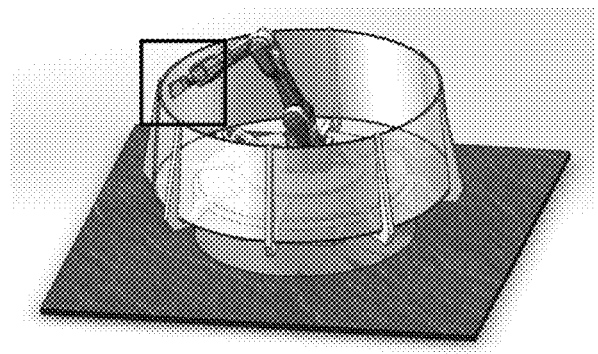
FIGS. 2A-B schematically illustrate an overall structure of a device for automatic detecting a through-hole rate of the honeycomb sandwich composite-based acoustic liner and a data acquisition system according to an embodiment of the present disclosure, respectively.
Figure 2B:
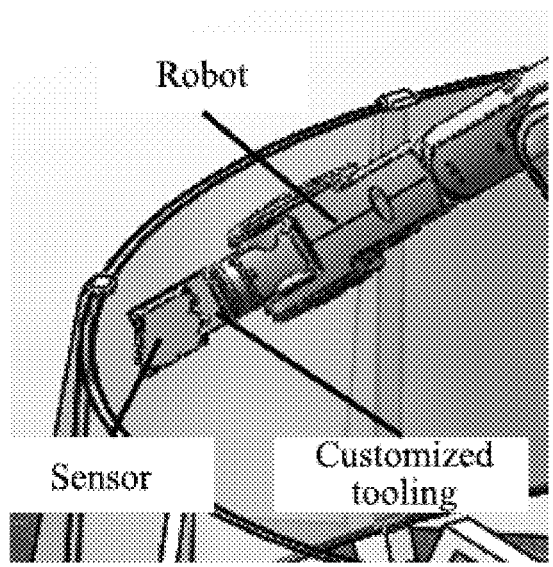

(S1) A three-dimensional (3D) point cloud data of an acoustic liner is acquired by a device, and the device is shown in FIGS. 2A-B.

The step (S1) is performed through the following steps.

(S101) A two-dimensional (2D) profile data of a surface of the acoustic liner is uniformly acquired for multiple times according to a planned trajectory.

(S102) A positional relationship between trajectories is calculated according to a preset data acquisition frequency. The 2D profile data is subjected to registration to obtain the 3D point cloud data according to the positional relationship.

(S2) A spatial distribution of the 3D point cloud data is detected. The 3D point cloud data is preprocessed to partially filter noise point clouds and remove a hole bottom data.

The step (S2) is performed through the following steps.

(S201) Two normal vectors in two different scale neighborhoods for each of points in the 3D point cloud data are calculated, where a scale is determined by a size of the actual hole feature.

(S202) The two normal vectors of each of the points in the 3D point cloud data are subtracted to obtain a difference vector. A norm Δn of the difference vector is calculated and compared with a preset threshold, where points with a norm Δn greater than the preset threshold are regarded as noise, and the noise and hole bottom points are removed from original data.

(S3) A main plane where a circular hole is located is detected. A boundary point cloud of a micro-hole is identified based on a neighborhood calculation method by analyzing a pattern of the micro-hole, and a relevant point is extracted.

The step (S3) is performed through the following steps.

(S301) An input data using a random sample consensus algorithm is processed to extract a plane as the main plane.

(S302) The input data is projected to the main plane.

(S303) A circle formed by each point and other two points in a K neighborhood thereof and the number $n_p$ of other neighborhood points existing in the circle are calculated.

(S304) A boundary parameter $n_b=1-n_p/K$ is calculated, where K is the number of points in a set search neighborhood.

Figure 3:
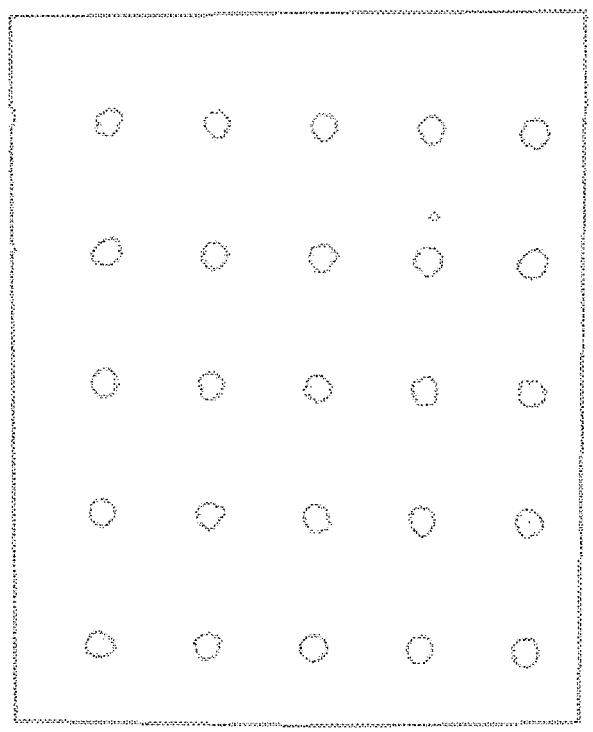
FIG. 3 schematically depicts a hole boundary extraction from a point cloud according to an embodiment of the present disclosure.

(S305) The boundary parameter $n_b$ is compared with a preset threshold, where in the 3D point cloud data, points with a boundary parameter $n_b$ greater than the preset threshold are taken as boundary points to detect the boundary point cloud, and the boundary point extraction results are shown in FIG. 3.

(S4) The boundary point cloud is subjected to clustering segmentation. A diameter of an actual hole and a hole center coordinate of the actual hole are calculated through a circle fitting algorithm based on geometric fitting, and the hole bottom data in an original data is searched along a direction of the main plane to get an accurate quality detection result.

The step (S4) is performed through the following steps.

(S401) A boundary point cloud data of a hole is input as $P_0$.

(S402) The input boundary point cloud data is fitted into a circle through a Hyperfit algorithm. A coordinate of a center of the circle and a radius $R_i$ of the circle are obtained.

(S403) A distance D from each of input boundary points to the circle is calculated through an expression of $D=|d-R_i|$, where a point with the distance D smaller than a bandwidth B is taken as a point cloud data $P_{i+1}$ input next time.

(S404) The radius $R_i$ is compared with a radius $R_{i-1}$ obtained by a previous fitting to calculate a difference $\Delta R_i$ through an expression of $\Delta R_i=R_i-R_{i-1}$.

If the difference $\Delta R_i$ is greater than a preset threshold, the Hyperfit algorithm is continuously run; otherwise, the running of the Hyperfit algorithm is stopped and a final fitting parameter is output.

Figure 4:
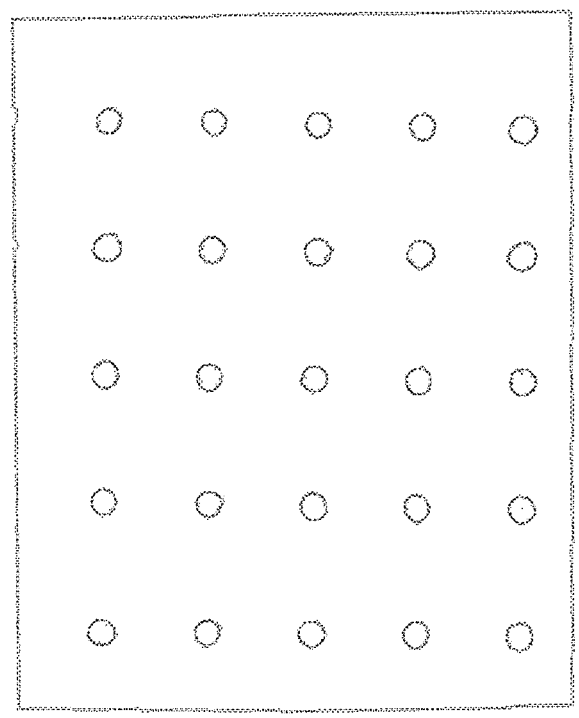
FIG. 4 schematically illustrates circle fitting of a boundary point cloud according to an embodiment of the present disclosure.

(S405) The point cloud data $P_{i+1}$ is input and steps (S402)-(S404) are repeated, and the circle fitting results are shown in FIG. 4.

(S406) In the original data, a normal section of a cylinder on the main plane is made by using the coordinate of the hole center detected in step (S4) as a circle center and a value slightly smaller than a theoretical hole diameter as a diameter. A cylindrical bounding box is made by taking a normal of the main plane as an axis.

(S407) A point cloud data in the cylindrical bounding box is stored as the hole bottom data.

(S408) A distance from the hole bottom data to the main plane is calculated as a hole detection depth.

Figure 5:
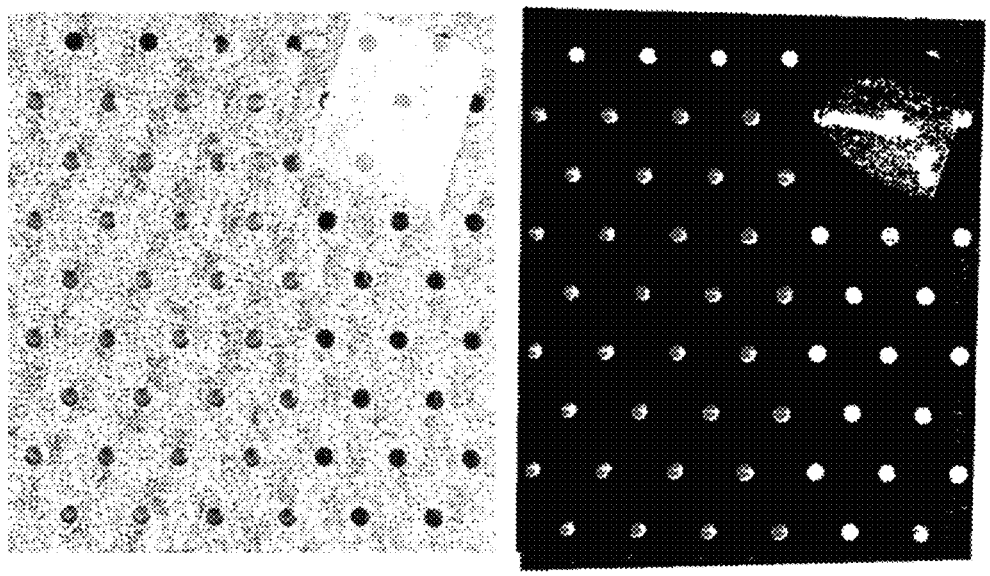
FIG. 5 shows a comparison between an actual picture and a detection result according to an embodiment of the present disclosure.

(S409) The hole detection depth is compared with a blockage standard, where a hole with a detection depth smaller than the blockage standard is denoted as a blocked hole, and marked in red in the point cloud data. The number of detected holes and the number of blocked holes are counted, and a through-hole rate $n_t$ is calculated through an expression of:

$$n_t = \frac{n_d}{n} * 100\%;$$

where $n_d$ is the number of blocked holes and n is the number of detected holes. As shown in FIG. 5, a local array hole area is detected, and the blocked holes can be marked through the method of the disclosure.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. A method for automatically detecting a through-hole rate of a honeycomb sandwich composite-based acoustic liner using a device for automatically detecting a through-hole rate of a honeycomb sandwich composite-based acoustic liner, the device comprising:
  a customized tooling;
  a data acquisition system;
  a motion mechanism; and a data processing system;

wherein the data acquisition system is configured to acquire a three-dimensional (3D) point cloud data of a surface of an acoustic liner; the data acquisition system comprises a two-dimensional (2D) laser profile sensor and a controller; the 2D laser profile sensor is configured to collect the 3D point cloud data of the surface of the acoustic liner by parallel movement shooting; and the controller is configured to be connected with a graphics workstation to input an acquired 3D point cloud data for subsequent processing;

the motion mechanism is configured to support the data acquisition system to perform translational scanning; the motion mechanism comprises an industrial robot with six degrees of freedom; an end of the industrial robot is capable of moving according to a path designed by an offline programming software; and the 2D laser profile sensor is fixed at the end of the industrial robot;

the data processing system comprises the graphics workstation; the data processing system is configured to play a role of path planning and data storage in a data acquisition process, and output a detection result through an improved algorithm; and the customized tooling is designed according to a mounting hole of the 2D laser profile sensor and a mounting hole of the end of the industrial robot to enable a position and angle of the 2D laser profile sensor relative to the end of the industrial robot to be fixed;

the method comprising:

(S1) acquiring, by the device, a 3D point cloud data of the acoustic liner;

(S2) detecting a spatial distribution of the 3D point cloud data, and preprocessing the 3D point cloud data to partially filter noise point clouds, and remove a hole bottom data;

(S3) detecting a main plane where a micro-hole is located; identifying a boundary point cloud of the micro-hole based on a neighborhood calculation method by analyzing a pattern of the micro-hole, and extracting a relevant point; and (S4) subjecting the boundary point cloud to clustering segmentation; calculating a diameter of an actual hole and a hole center coordinate of the actual hole through a circle fitting algorithm based on geometric fitting, and searching the hole bottom data in an original data along a direction of the main plane to get an accurate quality detection result.

2. The method of claim 1, wherein the step (S1) is performed through steps of:

(S101) uniformly acquiring a 2D profile data of a surface of the acoustic liner for multiple times according to a planned trajectory; and (S102) calculating a positional relationship between trajectories according to a preset data acquisition frequency; and subjecting the 2D profile data to registration to obtain the 3D point cloud data according to the positional relationship.

3. The method of claim 1, wherein the step (S2) is performed through steps of:

(S201) calculating two normal vectors in two different scale neighborhoods for each of points in the 3D point cloud data, wherein a scale is determined by a size of the actual hole; and (S202) subtracting the two normal vectors of each of the points in the 3D point cloud data to obtain a difference vector, and calculating a norm $\Delta n$ of the difference vector; comparing the norm $\Delta n$ of each of the points with a preset threshold, wherein points with a norm $\Delta n$ greater than the preset threshold are regarded as noise; and removing the noise and hole bottom points from original data.

4. The method of claim 1, wherein the step (S3) is performed through steps of:

(S301) processing an input data using a random sample consensus algorithm to extract a plane as the main plane;

(S302) projecting the input data to the main plane;

(S303) calculating a circle formed by each point and other two points in a K neighborhood thereof, and calculating the number $n_p$ of other neighborhood points existing in the circle;

(S304) calculating a boundary parameter $n_b=1-n_p/K$, wherein K is the number of points in a set search neighborhood; and (S305) comparing the boundary parameter $n_b$ with a preset threshold, wherein in the 3D point cloud data, points with a boundary parameter $n_b$ greater than the preset threshold are taken as boundary points to detect the boundary point cloud.

5. The method of claim 1, wherein the step (S4) is performed through steps of:

(S401) inputting a boundary point cloud data of a hole as $P_0$;

(S402) fitting the input boundary point cloud data into a circle through a Hyperfit algorithm; and obtaining a coordinate of a center of the circle and a radius $R_i$ of the circle;

(S403) calculating a distance D from each of input boundary points to the circle through an expression of $D=|d-R_i|$, wherein a point with the distance D smaller than a bandwidth B is taken as a point cloud data $P_{i+1}$ input next time;

(S404) comparing the radius $R_i$ with a radius $R_{i-1}$ obtained by a previous fitting to calculate a difference through an expression of $\Delta R_i = R_i - R_{i-1}$;

if the difference $\Delta R_i$ is greater than a preset threshold, continuing running the Hyperfit algorithm;

otherwise, stopping running the Hyperfit algorithm and outputting a final fitting parameter;

(S405) inputting the point cloud data $P_{i+1}$ and repeating steps (S402)-(S404);

(S406) in the original data, making a normal section of a cylinder on the main plane by using the coordinate of the hole center detected in step (S4) as a circle center and a value slightly smaller than a theoretical hole diameter as a diameter; and making a cylindrical bounding box by taking a normal of the main plane as an axis;

(S407) storing a point cloud data in the cylindrical bounding box as the hole bottom data;

(S408) calculating a distance from the hole bottom data to the main plane as a hole detection depth; and (S409) comparing the hole detection depth with a blockage standard, wherein a hole with a detection depth smaller than the blockage standard is denoted as a blocked hole, and marked in red in the point cloud data; and counting the number of detected holes and the number of blocked holes, and calculating a through-hole rate $n_t$ through an expression of:

$$n_t = \frac{n_d}{n} * 100\%;$$

wherein $n_d$ is the number of blocked holes and n is the number of detected holes.

* * * * *